United States Patent [19]
Nouchi et al.

[11] Patent Number: 5,675,688
[45] Date of Patent: Oct. 7, 1997

[54] DISPERSION-SHIFTED MONOMODE OPTICAL FIBER

[75] Inventors: Pascale Nouchi, Villebon sur Yvette; Pierre Sansonetti, Palaiseau; Olivier Audouin, Savigny sur Orge; Jean-Pierre Hamaide, Saint Germain les Arpajon, all of France

[73] Assignee: Alcatel Fibers Optiques, Bezons Cedex, France

[21] Appl. No.: 643,095

[22] Filed: May 2, 1996

Related U.S. Application Data

[62] Division of Ser. No. 637,784, filed as PCT/FR95/01121, Pat. No. 5,659,649.

[30] Foreign Application Priority Data

Sep. 5, 1994 [FR] France ........................ 94 10615

[51] Int. Cl.$^6$ ............................................ G02B 6/26
[52] U.S. Cl. .................. 385/124; 385/126; 385/127; 359/161
[58] Field of Search ............................. 385/122–128; 359/161, 188, 195

[56] References Cited

U.S. PATENT DOCUMENTS

| | | | |
|---|---|---|---|
| 4,406,518 | 9/1983 | Matsumura et al. | 350/96.31 |
| 4,755,022 | 7/1988 | Ohashi et al. | 385/124 X |
| 5,555,340 | 9/1996 | Ohashi et al. | 385/124 X |

FOREIGN PATENT DOCUMENTS

| | | |
|---|---|---|
| 0131634A1 | 1/1985 | European Pat. Off. . |
| 0368014A1 | 5/1990 | European Pat. Off. . |
| 2118321 | 10/1983 | United Kingdom . |
| 2140169 | 11/1984 | United Kingdom . |

OTHER PUBLICATIONS

G. Mahlke et al, "Lichtwellenleiterkabel" *SEIMENS AG*, 1986 Berlin Munchen pp. 49–51 No Month.

S. Mahmoud et al, "Transmission characteristics of a coaxial optical fiber line", *Journal of Lightwave Technology*, vol. 11, No. 11, Nov. 1993, NY US, pp. 1717–1720.

F. Ruhl, "Cutoff decomposition on multiply clad fibers", *Journal of Lightwave Technology*, vol. 4, No. 11, Nov. 1986, New York, US, pp. 1651–1654.

V.A. Bhagavatuala et al, "Bend–Optimized Dispersion–Shifted Single–Mode Designs", *Journal of Lightwave Technology*, vol. LT–3, No. 5, 1985 New York, pp. 954–957 No Month.

Vengsarkar A.M. et al, "Dispersion–compensating sigle–mode fibers: efficient designs for first–and second–order compensation", *Optics Letters*, vol. 18, No. 11 1 Jun. 1993, pp. 924–926, XP000304592.

*Primary Examiner*—Phan T. H. Palmer
*Attorney, Agent, or Firm*—Sughrue, Mion, Zinn, Macpeak & Seas, PLLC

[57] ABSTRACT

Dispersion-shifted monomode optical fibers have an effective mode surface area greater than 65 µm$^2$ by optimization of the geometrical characteristics that characterize the fibers.

2 Claims, 3 Drawing Sheets

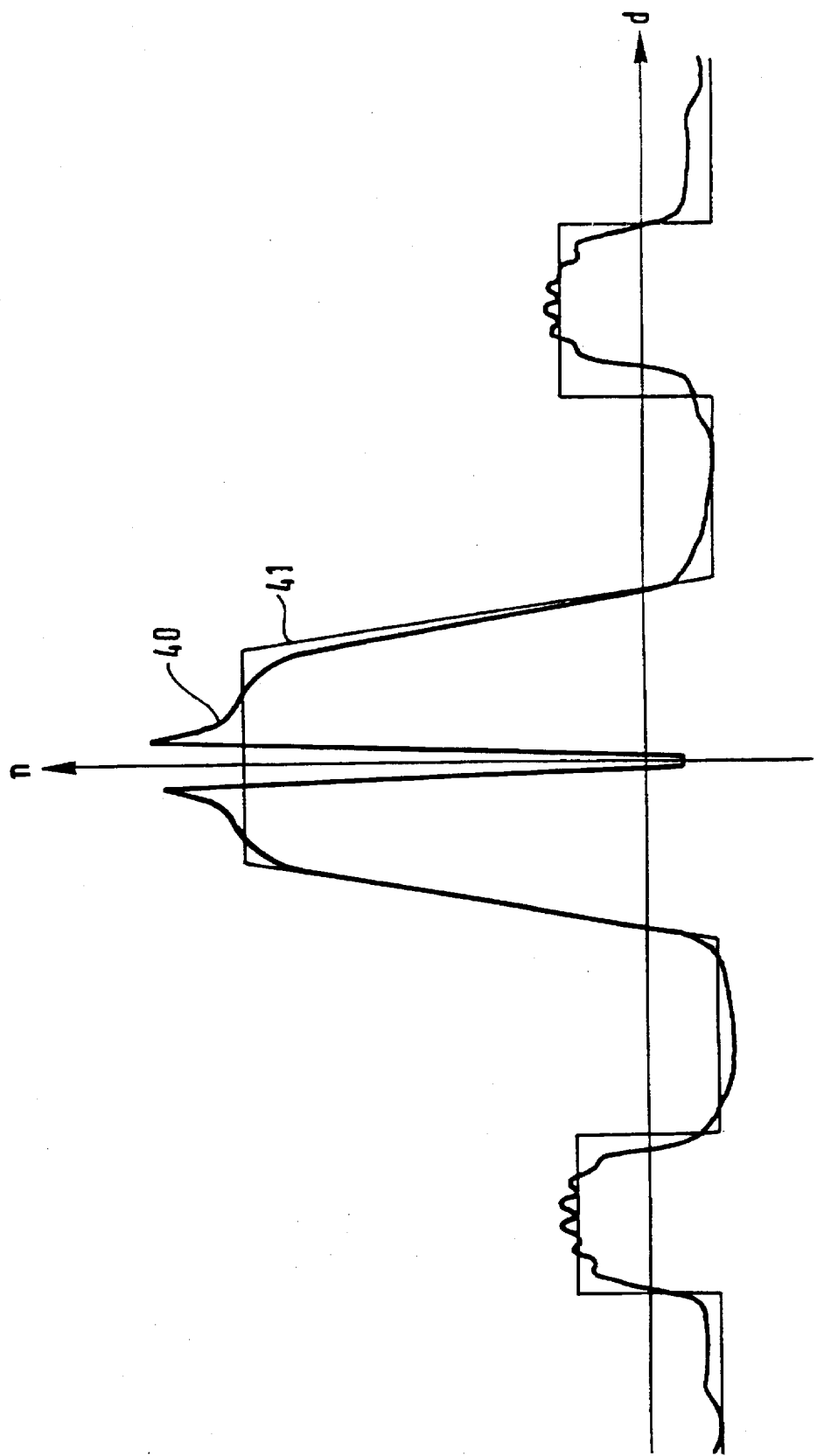

DISPERSION-SHIFTED MONOMODE OPTICAL FIBER

This is a divisional of U.S. application Ser. No. 637,784 entitled "A Dispersion-Shifted Monomode Optical Fiber" filed as PCT/FR95/01121 now U.S. Pat. No. 5,659,649.

The present invention relates to a dispersion-shifted monomode optical fiber.

BACKGROUND OF THE INVENTION

So-called "dispersion-shifted" monomode optical fibers are such that at the transmission wavelength at which they are used, which is generally other than 1.3 µm (the wavelength at which the dispersion of silica is substantially zero), the chromatic dispersion of the transmitted wave is substantially zero, i.e. the non-zero chromatic dispersion of the silica is compensated (hence the use of the term "offset") in particular by an increase in the index difference $\Delta n$ between the core and the optical cladding.

The transmission wavelength presently selected for line fibers, i.e. fibers designed to perform long distance transmission, e.g. for transoceanic connections, is substantially equal to 1.55 µm. It is at this wavelength that it is possible to obtain minimum transmission attenuation of light, of the order of 0.2 dB/km.

Thus, in the context of the present invention, the fibers under consideration are designed to be used at a wavelength of 1.55 µm since that is the most efficient for transmission.

Also, it is well known that the bandwidth of monomode optical fibers is much greater than that of multimode fibers, which is why present and future developments of lines for long distance transmission concentrate on monomode optical fibers.

Consequently, the present invention applies most particularly to dispersion-shifted monomode optical fibers designed to be used at a wavelength substantially equal to 1.55 µm.

More precisely, the invention relates to such optical fibers in which curvature losses do not exceed 0.005 dB/m when the radius of curvature is 30 mm. It is well known that such a limitation on curvature losses is necessary to ensure that the optical fiber operates under proper transmission conditions.

At present, numerous dispersion-shifted monomode optical fiber profiles are being studied and they are widely described in the literature.

The simplest known profiles referred to as "step", "trapezium", or "triangle", are such that the refractive index in the core varies as a function of distance from the axis of the fiber, so that when shown as a function of said distance the index appears as a curve constituting respectively a rectangle, a trapezium, or a triangle, while the index in the optical cladding surrounding the core is constant and less than that of the core.

A "pedestal" profile is also known in which the central portion forming the "inner" core of the optical fiber is surrounded successively by an "outer" core of refractive index lower than that of the inner core, and then by optical cladding of index lower than that of the outer core.

Also known is a profile referred to as being of the "trapezium and central ring" type which is shown very diagrammatically in FIG. 1, where there can be seen the curve representing the refractive index n in the fiber as a function of distance d from the axis of the fiber. In that profile, the core C comprises:

a central portion 10 having a maximum index $n_s+\Delta n$ in which the index varies in such a manner as to give the curve the form of a trapezium, and in the limit, of a triangle or of a rectangle;

a layer 11 of index $n_s$, e.g. constant and less than $n_s+\Delta n$, surrounding the central portion 10; and a layer 12 surrounding the layer 11 and of index $n_s+h\Delta n$ (0<h<1), which is constant for example, greater than $n_s$, and less than $n_s+\Delta n$.

The layer 12 is surrounded by a cladding layer G of index equal to $n_s$.

In practice, the term "trapezium" when used for the central portion 10 of the core C covers the limiting shapes of a triangle and of a rectangle.

Finally, as described in an article entitled "Transmission characteristics of a coaxial optical fiber line", published in Journal of Lightwave Technology, Vol. 11, No. 11, November 1993, a profile is known of the "buried central hollow" type which is shown very diagrammatically in FIG. 2, where there can be seen the curve of refractive index n in the optical fiber as a function of distance d from the axis of the fiber. In that profile, the core C' comprises a central portion 20 of minimum index $n_s+h\Delta n$ (h<0) surrounded by a layer 21 of index $n_s+\Delta n$ greater than $n_s+h\Delta n$. The layer 21 is surrounded by a cladding layer G' of index equal to $n_s$.

It is recalled that all of the above-mentioned profiles are naturally circularly symmetrical about the axis of the optical fiber.

All of those profiles make it possible to obtain substantially zero chromatic dispersion at 1.55 µm, while also obtaining low attenuation and curvature losses. Nevertheless, a constant concern in the context of developing long distance links using optical fibers is that of further improving transmission quality and of reducing the cost thereof.

Transmission quality is associated with the signal-to-noise ratio along the link, with noise coming from amplified spontaneous emission generated by the amplifiers belonging to the repeaters used along the transmission line, and it has been shown that this signal-to-noise ratio is itself inversely proportional to a "penalty" function F of the fiber which depends on the distance Z between amplifiers, on the effective mode surface area $S_{eff}$ of the optical fiber used, on the population inversion factor $n_{sp}$, on the linear attenuation $\alpha$, and on the coupling coefficients $C_1$ and $C_2$ respectively at the inlet and at the outlet of an amplifier. The penalty function F is thus given by the formula:

$$F = \frac{n_{sp}\alpha}{S_{eff}} \left( \frac{e^{\alpha z}}{C_1 C_2} - 1 \right) \frac{C_2}{(\alpha Z)^2} \left( \frac{e^{\alpha z}-1}{e^{\alpha z}} \right)$$

From that formula, it will be understood that to improve transmission quality, attempts can be made:

to reduce the population inversion factor $n_{sp}$, leaving other things equal; nevertheless that requires complex development with respect to pumping wavelength and thus concerning line components other than the optical fiber;

to reduce the attenuation $\alpha$; nevertheless since attenuation is already very low at 1.55 µm (in practice around 0.2 dB/km), any reduction that can be hoped for will have little influence on the penalty function F;

to act on the coupling coefficients $C_1$ and $C_2$; that also requires action to be taken on line components other than the optical fiber and therefore requires complex development; and/or to increase the effective mode surface area $S_{eff}$; that does indeed make it possible to improve the quality of the link.

FIG. 3 shows the penalty function F in dB for an optical fiber using soliton type transmission and plotted as a function of the distance Z in km between amplifiers for a known optical fiber having an effective mode surface area of 50 μm² (curve 30) and for a desirable optical fiber having an effective mode surface area of 70 μm² (curve 31), with all the other parameters on which F depends being given and remaining unchanged. It can be seen that for given penalty function, i.e. given signal-to-noise ratio, the greater the effective mode surface area, the greater the distance between amplifiers, thus making it possible to reduce the number of repeaters used, and hence reduce the cost of the system.

Also, it can be seen that for given distance between amplifiers, the greater the effective mode surface area, the smaller the penalty function, i.e. the better the quality of transmission.

Hence, to improve transmission quality, or indeed in equivalent manner, to reduce the number of repeaters used for given quality of the link, thus making it possible to reduce the cost of the link, it is advantageous to increase the effective mode surface area.

With simpler index profiles, such as the step, trapezium, or triangle profiles, in order to obtain substantially zero chromatic dispersion at 1.55 μm, i.e. to compensate for the chromatic dispersion of silica at 1.55 μm, it is necessary to increase the index difference between the core and the cladding, thereby necessarily giving rise to a decrease in the effective mode surface area.

Thus, to obtain large effective mode surface areas while ensuring substantially zero chromatic dispersion at 1.55 μm, it is necessary to opt for more complex index profiles such as the profiles shown in FIGS. 1 and 2.

Until now, studies performed on the trapezium and central ring type profile have led to effective mode surface areas that do not exceed 50 μm² to 60 μm². So far no study has been performed on the buried central hollow profile enabling an effective mode surface area to be determined.

OBJECT AND SUMMARY OF THE INVENTION

The object of the present invention is thus to optimize the geometrical parameters of known profiles to make it possible to obtain effective mode surface areas greater than those obtained with conventional profiles, so as to make monomode optical fibers of zero chromatic dispersion in the vicinity of 1.55 μm while also having an effective mode surface area greater than 65 μm², and while maintaining attenuation and curvature losses equivalent to those obtained with known optical fibers.

To this end, the present invention provides a monomode optical fiber having substantially zero chromatic dispersion in the vicinity of 1.55 μm, comprising an optical core having:

a central portion whose refractive index as a function of distance from the axis of said fiber varies between a minimum index $n_s$ and a maximum index $n_s+\Delta n$, where $\Delta n$ is strictly positive, said index being represented by a curve that is substantially trapezium shaped;

a first layer surrounding said central portion, having an index substantially equal to $n_s$; and a second layer surrounding said first layer, having an index varying over the range $n_s$ to $n_s+h\Delta n$, where $0<h<1$;

and optical cladding surrounding said second layer and having an index substantially equal to $n_s$, said profile being defined by the following geometrical parameters:

a: total radius of the core, measured at said second layer;

x: ratio of the radius of said central portion to a, where $0<x<1$;

y: ratio of the radius of said first layer to a, where $x<y<1$; and r: ratio of the small base to the large base of said trapezium, with $0 \leq r \leq 1$;

said fiber being characterized in that a and $\Delta n$ are determined so that the chromatic dispersion of said fiber is substantially zero at 1.55 μm and the cutoff wavelength $\lambda_c$ of said fiber is such that: 1.4 μm$<\lambda_c=$1.55 μm, r being selected arbitrarily in the range 0 to 1, and then x, y, and h being selected so as to satisfy the following relationships:

1) $x_1(r) \leq x \leq x_2(r)$ with when $r \leq 0.5$: $\begin{cases} x_1(r) = 0.25 - 0.2r \\ x_2(r) = 0.45 \end{cases}$ and when $r > 0.5$: $\begin{cases} x_1(r) = 0.15 \\ x_2(r) = 0.6 - 0.3r \end{cases}$ 2) $y_1(x,r) \leq y \leq y_2(x,r)$ with:

$y_2(x,r) = y_1(x,r) + (1+r)x$ and:

when $r \leq 0.5$: $\begin{cases} x \leq 0.3: y_1(x,r) = \frac{4}{3} rx + x - 0.2r \\ x > 0.3: y_1(x,r) = 3x + 0.2r - 0.6 \end{cases}$ when $r > 0.5$: $\begin{cases} x \leq 0.3: y_1(y,r) = \frac{10}{3} rx - 0.5r + 0.15 \\ x > 0.3: y_1(x,r) = 3x + 0.5r - 0.75 \end{cases}$ 3) $0.3 \leq \frac{2(1-y)h}{x(1+r)} \leq 0.45 + 0.3r$ In practice, relationship 3) sets limit values for the ratio of the surface area defined by the curve giving n as a function of d for the central ring of the profile over the surface area defined by the curve giving n as a function of d for the trapezium.

With the optical fiber of the invention having the trapezium and central ring type profile, effective mode surface areas are obtained that are greater than 65 μm², extending up to 85 μm². For given quality of a link, this makes it possible to increase the distance between amplifiers by 10% to 30%.

The present invention also proposes, to solve the problem posed, a monomode optical fibers with substantially zero chromatic dispersion in the vicinity of 1.55 μm, comprising an optical core having:

a central portion of index varying with distance from the axis of said optical fiber between a minimum index $n_s+h\Delta n$, with $-1<h<0$ and with $\Delta n$ strictly positive, and a maximum index $n_s$;

a layer surrounding said central portion, of index that varies with distance from the axis of said fiber over the range $n_s$ to $n_s+\Delta n$;

and optical cladding surrounding said layer and having an index substantially equal to $n_s$, said profile being defined by the following geometrical parameters:

a: total radius of the core measured at said layer;

y: ratio of the radius of said central portion to a, where $0<y<1$;

said fiber being characterized in that a and $\Delta n$ are determined so that the chromatic dispersion of said fiber is substantially zero at 1.55 μm and the cutoff wavelength $\lambda_c$ of said fiber is such that: 1.4 μm$<\lambda_c<$1.55 μm, y being an arbitrary value in the range 0 to 1, and h being selected so that the following relationships are satisfied:

1) $h_1(y) \leq h \leq h_2(y)$ where:

$$\begin{cases} h_1(y) = -6.56 + 14.96y - 8.71y^2 \text{ and} \\ h_2(y) = -6.2 + 16.76y - 11.61y^2 \end{cases}$$

2) $-2.33y + 0.6 < h < -0.2$.

With the optical fiber of the invention having a profile of the buried central hollow type, effective mode surface areas are obtained that are greater than 65 μm², and that extend up to 95 μm². This likewise makes it possible, for given quality of the link, to increase the distance between amplifiers by 10% to 40%.

BRIEF DESCRIPTION OF THE DRAWINGS

Other characteristics and advantages of the present invention appear from the following description of implementations of the present invention, given by way of non-limiting illustration.

In the following figures:

FIG. 4 shows variations in the ideal and real refractive indices n as a function of distance d from the axis of the optical fiber for various layers of a monomode optical fiber having a profile of the trapezium and central ring type.

MORE DETAILED DESCRIPTION

Figure 1:
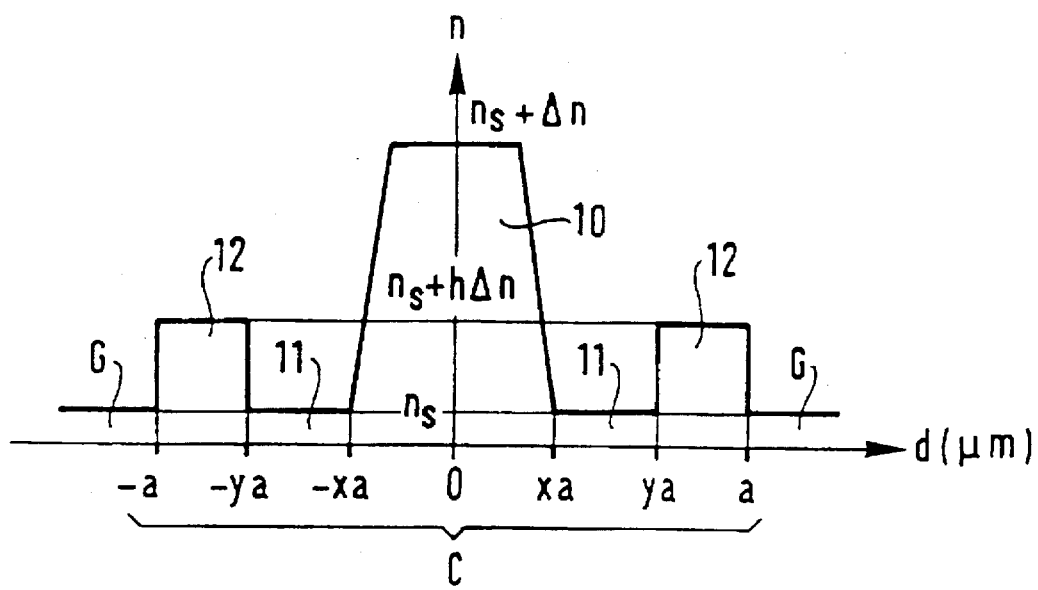
FIG. 1 shows variations in the refractive index n as a function of distance d from the axis of the optical fiber for various layers of a monomode fiber having a profile of the trapezium and central ring type.
Figure 2:
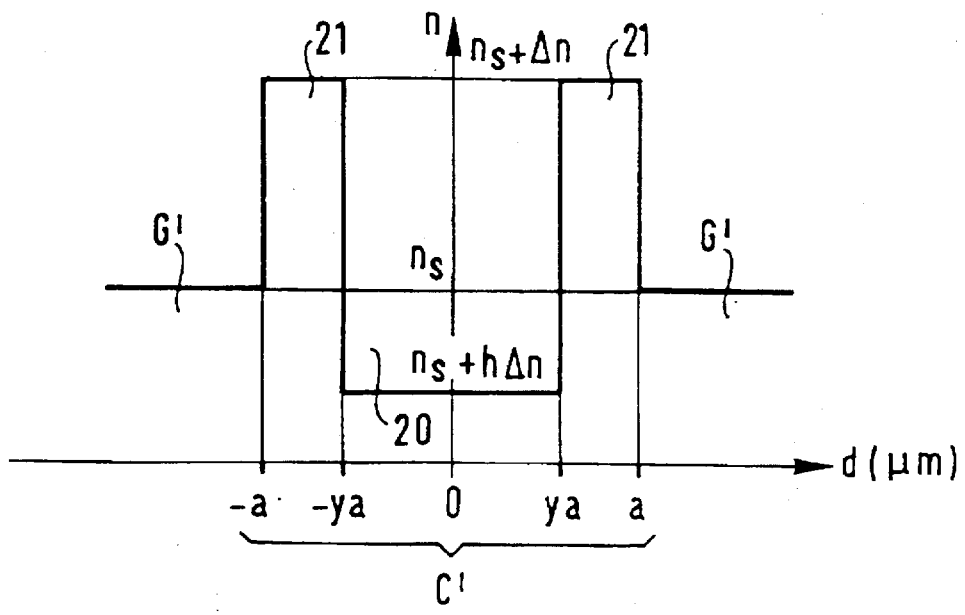
FIG. 2 shows variations in the refractive index n as a function of distance d from the axis of the optical fiber for various layers of a monomode fiber having a profile of the buried central hollow type.
Figure 3:
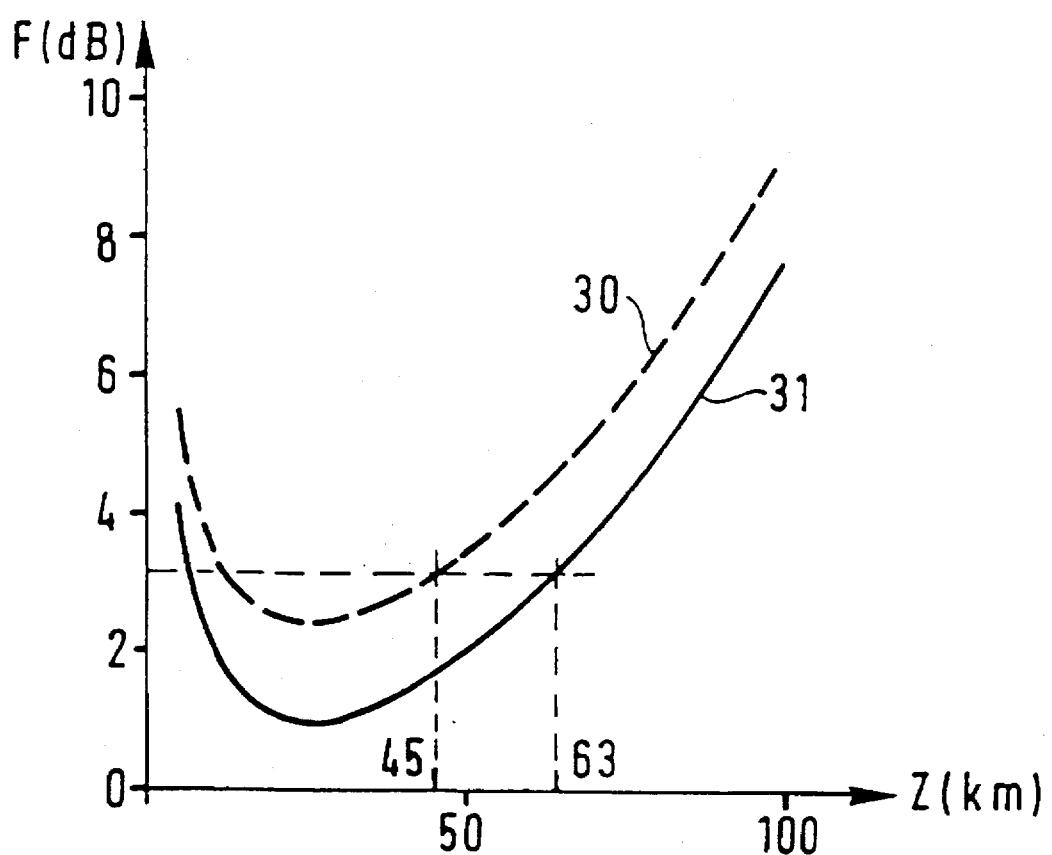
FIG. 3 shows the penalty function F as a function of distance Z between amplifiers for a monomode optical fiber having substantially zero chromatic dispersion at 1.55 μm and using soliton type transmission.

FIGS. 1 to 3 are described above in the description of the state of the art.

As specified above, the known profiles of the trapezium and central ring type and of the buried central hollow type make it possible, by selecting their geometrical parameters in application of the criteria of the present invention, to obtain effective mode surface areas that are considerably greater than those obtained either with conventional profiles of the step, trapezium, or triangle type, or with trapezium and central ring or buried central hollow type profiles as implemented in the prior art. The present invention thus makes it possible to optimize the selection of geometrical parameters for these profiles so as to satisfy requirements in terms of effective mode surface area, chromatic dispersion, attenuation, and curvature losses.

Three possible implementations of the present invention are described below as examples, giving values for the above-defined geometrical parameters and satisfying the relationships of the invention, and also giving the effective mode surface area, the chromatic dispersion at 1.55 μm, the cutoff wavelength, the attenuation, and the curvature losses obtained with profiles possessing these characteristics.

Initially it is recalled that all of the geometrical characteristics of the profiles of the invention are functions of two basic parameters: the total radius a of the fiber core, and the index difference Δn between the maximum index of the core and the index of the cladding.

These fundamental parameters can be determined in conventional manner so as to satisfy the essential requirements for optical fibers in the context of the present invention, these requirements being the following:

substantially zero chromatic dispersion, i.e., in practice, less than 1 ps/(nm.km) in the vicinity of 1.55 μm;

a cutoff wavelength $\lambda_c$ such that: 1.4 μm<$\lambda_c$<1.55 μm to ensure that transmission is monomode at the desired wavelengths and to reduce curvature losses; and attenuation close to 0.2 dB/km.

It is briefly recalled how the parameters a and Δn can be selected to satisfy the above criteria for a profile of the trapezium and central ring type, with the reasoning applying in similar manner to a profile of the buried central hollow type.

In known manner, chromatic dispersion C can be put in the form of a function of wavelength λ as follows:

$$C(\lambda) = M(\lambda) - \frac{\Delta n}{c\lambda} V \frac{d^2(VB)}{dV^2} + \epsilon(\lambda) \quad (1)$$

where:

$M(\lambda)$ is a known term characterizing the chromatic dispersion of pure silica at wavelength λ ($M(\lambda)$ is about 22 ps/(nn.km) at 1.55 μm);

$$V \frac{d^2(VB)}{dV^2}$$

is a term characterizing the dispersion of the waveguide, V being normalized frequency and B being normalized effective index (it is recalled that the effective index is the index as effectively "seen" by the lightwave propagating in the core), which is a function of V;

c is the speed of light in a vacuum; and $\epsilon(\lambda)$ is a negligible term.

Given that it is a desire to have a cutoff wavelength $\lambda_c$ such that guidance is monomode in the range 1.4 μm to 1.55 μm, a range can be deduced therefrom defining variations in the normalized frequency V, and thus a corresponding range for B. It is therefore possible to deduce Δn of equation (1) and then a of equation (2) which gives the normalized frequency:

$$V = \frac{2\pi}{\lambda} a \sqrt{2n_r \Delta n} \quad (2)$$

$n_r$ being the index of the cladding and λ being the operating wavelength.

In general, for optical fibers having a profile of the trapezium and central ring type, in order to satisfy the above conditions, the core radius a can be selected to lie in the range 2 μm to 9 μm, and the index difference Δn to lie in the range $8 \times 10^{-3}$ to $20 \times 10^{-3}$.

For optical fibers having a profile of the buried central hollow type, to satisfy the above conditions, the core radius a can be selected to lie in the range 2.5 μm to 4 μm, and the index difference Δn to lie in the range $12 \times 10^{-3}$ to $20 \times 10^{-3}$.

Also, for the trapezium and ring type profile, the value of r can be selected arbitrarily in the range 0 to 1, and it will be understood that the term "trapezium" should be interpreted broadly in the context of the present invention, specifically as including the limiting cases where r is equal to 0 (the trapezium is then a triangle) or equal to 1 (the trapezium is then a rectangle).

The same applies to the value y for the profile of the buried central hollow type, where y can be selected arbitrarily between 0 and 1 in the strict sense.

EXAMPLE 1

In this example, the optical fiber is of the trapezium and central ring type. The values of the various characteristic parameters of the fiber are as follows:

a=6.97 µm
$\Delta n = 10 \times 10^{-3}$
r=0.6
x=0.35
y=0.69
h=0.325.

With such a fiber, chromatic dispersion is 0.685 ps/(nm.km) at 1558 nm, the cutoff wavelength is 1.48 µm, and attenuation is 0.20 dB/km. Curvature losses are less than 0.005 dB/m, for a radius of curvature of 30 mm.

The effective mode surface area is 71 µm².

EXAMPLE 2

In this example, the optical fiber is of the buried central hollow type. The values of the various characteristic parameters of the fiber are as follows:

a=3.07 µm
$\Delta n = 15.6 \times 10^{-3}$
y=0.56
h=0.55.

With such a fiber, chromatic dispersion is 0.7 ps/(nm.km) at 1558 nm, the cutoff wavelength is 1.485 µm, and attenuation is about 0.21 dB/km. Curvature losses are less than $5 \times 10^{-7}$ dB/m.

The effective mode surface area is 71.9 µm².

EXAMPLE 3

In this example, the optical fiber is of the buried central hollow type. The values of the various characteristic parameters of the fiber are as follows:

a=3.3 µm
$\Delta n = 14.7 \times 10^{-3}$
y=0.606
h=0.599.

With such a fiber, chromatic dispersion is 0.7 ps/(nm.km) at 1558 nm, the cutoff wavelength is 1.485 µm, and attenuation is about 0.21 dB/km. Curvature losses are less than $10^{-3}$ dB/m.

The effective mode surface area is 89.8 µm².

Naturally, the present invention is not limited to the particular implementations described above.

In particular, when precise geometrical shapes such as trapezium, triangles, rectangles, etc. are mentioned, it is clear that in practice, the profiles obtained may depart to a greater or lesser extent from ideal profiles, and it has been shown in the literature that such departures, providing they are kept under control, do not alter the expected properties of the optical fibers concerned. By way of example, FIG. 4 shows a real profile 40 of the trapezium and central ring type, as measured on an optical fiber. It is shown that the real profile 40 is equivalent to the ideal profile 41 also shown in FIG. 4. For greater details on such equivalence, reference may be made to Hitachi's patent U.S. Pat. No. 4,406,518.

Also, it is clear that the central ring of the trapezium and central ring type of profile is not necessarily of the ideal rectangle shape, but may likewise have an ideal trapezium or triangle shape, and more generally it may in practice have any shape equivalent thereto.

Thus, for fibers of the invention, it is important that the geometrical parameters (distance from the axis of the fiber, index difference) should substantially satisfy the relationships of the invention, but there is no need for the real shape of the curves to comply exactly to the ideal geometrical shape of the profile under consideration.

Finally, any means may be replaced by equivalent means without going beyond the ambit of the invention.

We claim:

1. A monomode optical fibers with substantially zero chromatic dispersion in the vicinity of 1.55 µm, comprising an optical core having:

a central portion of index varying with distance from the axis of said optical fiber between a minimum index $n_s + h\Delta n$, with $-1<h<0$ and with $\Delta n$ strictly positive, and a maximum index $n_s$;

a layer surrounding said central portion, of index that varies with distance from the axis of said fiber over the range $n_s$ to $n_s + \Delta n$;

and optical cladding surrounding said layer and having an index substantially equal to $n_s$, said profile being defined by the following geometrical parameters:

a: total radius of the core measured at said layer;

y: ratio of the radius of said central portion to a, where 0<y<1;

said fiber being characterized in that a and $\Delta n$ are determined so that the chromatic dispersion of said fiber is substantially zero at 1.55 µm and the cutoff wavelength $\lambda_c$ of said fiber is such that 1.4 µm<$\lambda_c$<1.55 µm, y being an arbitrary value in the range 0 to 1, and h being selected so that the following relationships are satisfied:

1) $h_1(y) \leq h \leq h_2(y)$ where:

$$\begin{cases} h_1(y) = -6.56 + 14.96y - 8.71y^2 \text{ and} \\ h_2(y) = -6.2 + 16.76y - 11.61y^2 \end{cases}$$

2) $-2.33y + 0.6 < h < -0.2$.

2. An optical fiber according to claim 1, characterized in that a lies in the range 2.5 µm to 4 µm, and $\Delta n$ lies in the range $12 \times 10^{-3}$ to $20 \times 10^{-3}$.

* * * * *